United States Patent
Higuchi

(10) Patent No.: US 7,731,232 B2
(45) Date of Patent: Jun. 8, 2010

(54) VEHICLE AIRBAG DEVICE

(75) Inventor: Hitoshi Higuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 11/957,879

(22) Filed: Dec. 17, 2007

(65) Prior Publication Data

US 2008/0143086 A1 Jun. 19, 2008

(30) Foreign Application Priority Data

Dec. 18, 2006 (JP) ............................ 2006-340528
Dec. 18, 2006 (JP) ............................ 2006-340539
Dec. 18, 2006 (JP) ............................ 2006-340546

(51) Int. Cl.
*B60R 21/276* (2006.01)

(52) U.S. Cl. ...................... 280/739; 280/729; 280/736; 280/742

(58) Field of Classification Search ................ 280/729, 280/739, 742, 736, 743.1
See application file for complete search history.

(56) References Cited

U.S. PATENT DOCUMENTS

| | | | | |
|---|---|---|---|---|
| 6,059,312 | A * | 5/2000 | Staub et al. ................ | 280/729 |
| 6,428,041 | B1 * | 8/2002 | Wohllebe et al. ........... | 280/736 |
| 6,554,313 | B2 * | 4/2003 | Uchida ....................... | 280/729 |
| 6,669,229 | B2 * | 12/2003 | Thomas ...................... | 280/732 |
| 7,325,830 | B2 * | 2/2008 | Higuchi et al. .............. | 280/738 |
| 2001/0003395 | A1 * | 6/2001 | Ariyoshi ..................... | 280/729 |
| 2002/0113416 | A1 * | 8/2002 | Uchida ....................... | 280/729 |
| 2005/0127648 | A1 * | 6/2005 | Fischer et al. ............... | 280/739 |
| 2008/0303256 | A1 * | 12/2008 | Williams .................... | 280/742 |

FOREIGN PATENT DOCUMENTS

| | | |
|---|---|---|
| JP | 52-3233 | 1/1977 |
| JP | 2002-160600 | 6/2002 |

* cited by examiner

*Primary Examiner*—Paul N Dickson
*Assistant Examiner*—Drew Brown
(74) *Attorney, Agent, or Firm*—Rankin, Hill & Clark LLP

(57) ABSTRACT

A vehicle airbag device in which an airbag is deployed by gas emitted by an inflator. The airbag has a pocket part, which is formed in a lower surface of the airbag and passes over an upper end of an obstacle. An introduction tube for introducing gas emitted by the inflator into the airbag extends into the airbag. When the airbag is deploying, but an obstacle prevents the airbag from doing so, a distal end part of the introduction tube will be blocked off, and the gas will be released to the exterior through a gas release part.

10 Claims, 17 Drawing Sheets

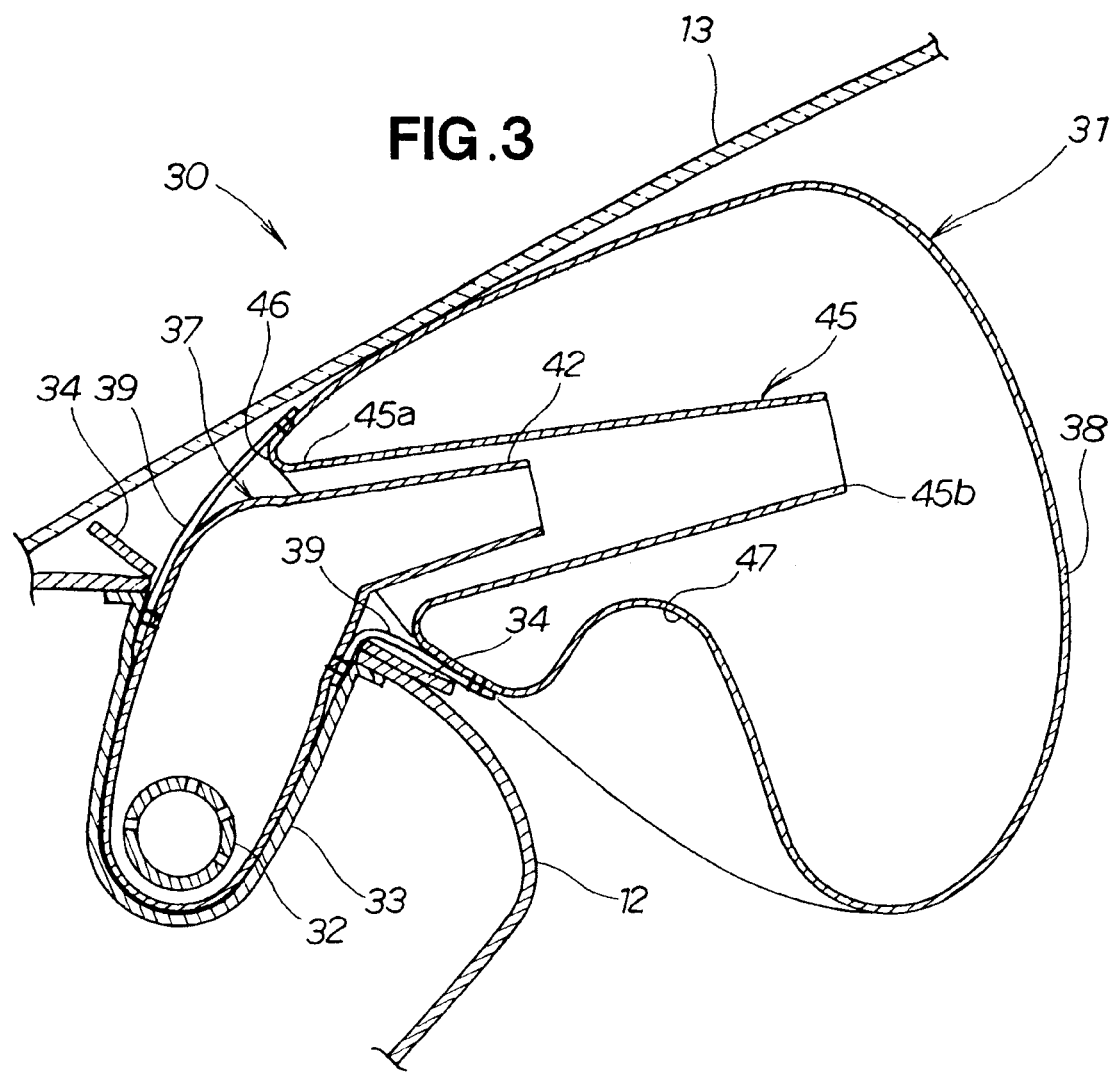

VEHICLE AIRBAG DEVICE

FIELD OF THE INVENTION

The present invention relates a vehicle airbag device for deploying an air bag in an emergency to protect an occupant.

BACKGROUND OF THE INVENTION

An airbag device generally has an airbag for protecting an occupant, and an inflator for expanding the airbag.

However, an airbag device is known from Japanese Patent Application Laid-Open Publication No. 2002-160600, wherein an airbag is deployed, a child seat is restrained, impact on the child seat is alleviated, and a child occupant is retrained so that when the child seat has been installed in the occupant seat so as to be facing backward, the safety of the child will be heightened in the event of a collision. The airbag device will be described below with reference to FIG. 13 hereof.

An airbag device 200 shown in FIG. 13 is provided to a passenger seat 206. The airbag device 200 has an airbag 201; an inflator 202 for expanding the airbag 201; a case 203 for accommodating the airbag 201 and the inflator 202; a lid 204, which is provided to the case 203, and which is broken when the airbag 201 deploys; and a pocket part 205, which is formed in the airbag 201, and which accommodates a backrest part 208 of a child seat 207 when the child seat 207 is installed in a passenger seat 206.

However, according to the airbag device 200, the child seat 207 is not a component that is unique to the vehicle; therefore, a variety of child seats 207 may be attached to the occupant seat 206. For example, when the child seat 207 has a high backrest part 208, the airbag 201 may not be able to pass over the upper end of the backrest part 208. At this time, the backrest part 208 of the child seat 207 will be pushed backwards by the airbag 201, which is an undesirable arrangement.

SUMMARY OF THE INVENTION

It is therefore an object of the present invention to provide a vehicle airbag device in which a cushioning action of an airbag can be effectively used for a wide variety of child seats.

According to an aspect of the present invention, there is provided a vehicle airbag device which comprises: an airbag designed to be deployed toward an occupant in a vehicle; an inflator for supplying to the airbag a gas for deploying the airbag; an introduction tube extending into the airbag for introducing the gas into the airbag from the inflator; a gas release part for releasing the gas emitted from the inflator to an exterior when a distal end part of the introduction tube is blocked; and a pocket part formed in a bottom surface of the airbag in such a manner as to be inwardly recessed with respect to the airbag;

In the airbag device, when the airbag cannot pass over the upper end of the backrest part of the child seat, the airbag will come in contact with the backseat part of the child seat, the distal end part of the introduction tube will be closed off, and gas from the inflator will escape from the gas release part. The airbag can thereby be deployed to a lesser extent in a state in which the airbag comes into contact with an obstacle, i.e., the backrest part of the child seat. As a result, it is possible to prevent the child seat from being pushed further toward the rear of the vehicle than is necessary.

Preferably, the introduction tube functions as a one-way valve for preventing gas from flowing from the gas release part when internal pressure increases after the airbag is expanded. Therefore, the internal pressure of the airbag can be maintained until an object that is to be protected comes in contact with the airbag.

Desirably, the introduction tube is positioned so as to be set apart from the pocket part. Therefore, the introduction tube can be prevented from interfering with the pocket part when the airbag is deployed. Gas can thereby be caused to flow with minimal restriction toward the rear of the pocket part, and the airbag can reliably pass over the obstacle. As a result, the functions of the pocket part and the introduction tube can be adequately exhibited.

In a preferred form, the introduction tube extends in a tapered shape toward a largest length of the airbag when the latter is completely expanded. Therefore, the gas flowing from the introduction tube is rapidly directed along the largest length of the airbag, and the airbag rapidly deploys in front of the occupant. In particular, the distal end part of the introduction tube has a tapered shape. Therefore, gas can be caused to rapidly flow toward the direction in which the airbag deploys.

Preferably, the airbag has a first chamber part, which is disposed between the inflator and the introduction tube; and a second chamber part, which is connected to the first chamber part via the introduction tube, and which comes into contact with an object to be protected as a result of having been deployed using gas emitted by the inflator. Therefore, a two-stage airbag is obtained in which the second chamber part is deployed after the first chamber part is deployed. Gas that has accumulated in the first chamber part is supplied to the second chamber part. Specifically, first, the lid covering the airbag is knocked off as a result of the first chamber part being deployed, and the second chamber part is then deployed in order to protect an object that is to be protected. Therefore, the second chamber part is smoothly deployed, and the object to be protected is adequately protected.

Desirably, the gas release part is formed between the first chamber part and the second chamber part. The gas release part may thus be formed in the portion where the first chamber part and the second chamber part are connected, and the structure of the airbag is simplified.

It is preferable that the first chamber part has a secondary introduction tube for introducing gas into the introduction tube from the first chamber part. Thus, the gas emitted by the inflator is efficiently supplied from the first chamber part to the second chamber part.

In a preferred form, a portion on a distal end part of the introduction tube is folded so as to be positioned inside the introduction tube. Since a portion of the distal end part of the introduction tube is folded, the introduction tube is shortened accordingly, and the introduction tube is set apart from the inner surface of the airbag. When the airbag is being deployed, it is possible to avoid deploying the airbag to an unnecessary vertical length, and the airbag is deployed with the exterior shape conforming to the fully deployed shape.

Preferably, the second chamber part of the airbag is folded and accommodated in a case so as to lie on the folded first chamber part, and is covered by the lid. Thus, first, the first chamber part is deployed by the gas from the inflator, and breaks the lid. The second chamber part then deploys and reduces the impact produced by the object to be protected. As a result, it is possible for the lid to be rapidly broken, and for the airbag to deploy in conformance with the fully deployed outer shape without deploying along the vertical length.

It is desirable that the first chamber part and the second chamber part be connected by connecting bands, and when the second chamber part expands, the connecting bands extend along an inner surface of the lid that covers the airbag.

Therefore, when the second chamber part is deployed, the second chamber part does not rub against the inner surface of the lid, and the second chamber part is protected from the lid.

BRIEF DESCRIPTION OF THE DRAWINGS

Certain preferred embodiments of the present invention will be described in detail below, by way of example only, with reference to the accompanying drawings, in which:

FIG. 3 is a cross-sectional view of the airbag device shown in FIG. 2;

DETAILED DESCRIPTION OF THE PREFERRED EMBODIMENTS

Figure 1:
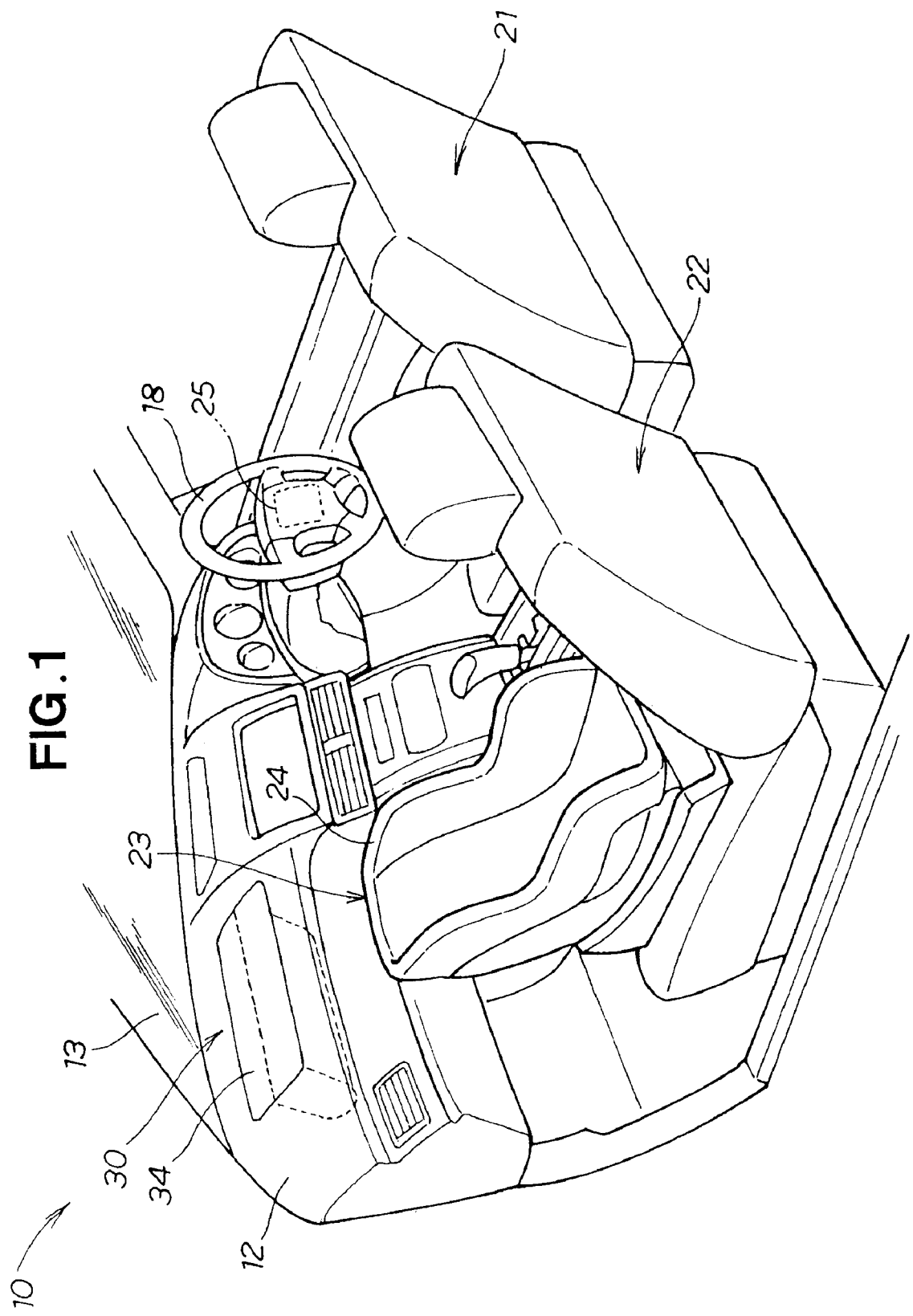
FIG. 1 is a perspective view of a state in which a child seat is mounted in a passenger seat of a vehicle so as to be facing backwards.

A vehicle 10 shown in FIG. 1 has a child seat 23 secured to a passenger seat so as to be facing rearward. The child seat 23 has a backrest part 24. An airbag module 25 for a driver seated in a driver seat 21 is provided to a steering wheel 18.

Figure 2:
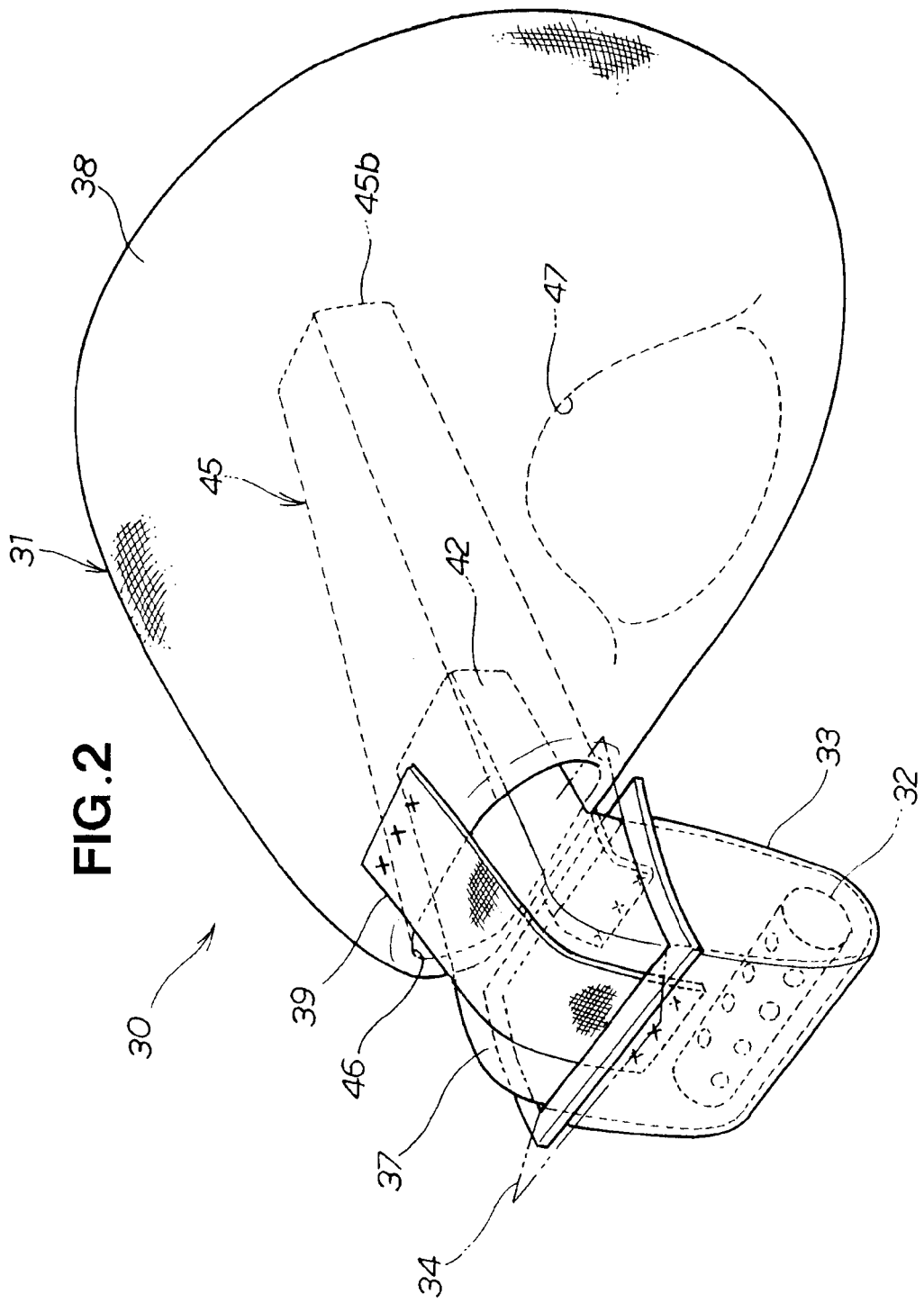
FIG. 2 is a perspective view showing an airbag device according to an embodiment of the present embodiment.

A passenger seat airbag module (airbag device) 30 of the present embodiment can effectively cushion a wide variety of child seats (obstacles) 23 by using an airbag 31 (FIG. 2). The airbag device 30 is provided inside an instrument panel 12, and deploys along a windshield 13, as shown in FIG. 3.

As shown in FIG. 2 and FIG. 3, the airbag device 30 has an airbag 31, which deploys towards an occupant; an inflator 32 for supplying gas to the airbag 31; a case 33 for accommodating the folded airbag 31 and the inflator 32; and a lid 34, which breaks when the airbag 31 is deployed.

The airbag 31 has a first chamber part 37 for breaking the lid 34 by being disposed on the inflator 32; a second chamber part 38, which comes into contact with an object that is to be protected, which is a child (occupant) seated in the child seat 23 (FIG. 1), by being connected to the first chamber part 37; connecting bands 39, 39 for connecting the first chamber part 37 and the second chamber part 38; and an introduction tube 45 integrally formed with the second chamber part 38. The connecting bands 39, 39 comprise a cloth in the present embodiment.

The first chamber part 37 is a member formed using a cloth member, is positioned between the inflator 32 and the second chamber part 38, and has a secondary introduction tube 42, which is inserted into the introduction tube 45 of the second chamber part 38. Gas emitted by the inflator 32 is introduced into the second chamber part 38 via the secondary introduction tube 42 and the introduction tube 45. Therefore, the gas emitted by the inflator 32 is efficiently supplied from the first chamber part 37 to the second chamber part 38.

The second chamber part 38 is a portion that comes into contact with an object that is to be protected, which is a child (occupant) that is seated in the child seat 23 (FIG. 1). The second chamber part 38 has a gas release part 46 for releasing gas that has entered from the first chamber part 37; and a pocket part 47, which is formed in a position corresponding to the backrest part 24 of the child seat 23 (FIG. 1).

The gas release part 46 is an opening formed in the second chamber part 38 in the portion where the first chamber part 37 and the second chamber part 38 are connected.

The pocket part 47 is formed so as to be inwardly recessed in a lower surface of the second chamber part 38.

The second chamber part 38 is formed using a cloth member. A proximal end part 45a of the introduction tube 45 is the gas release part 46.

The introduction tube 45 is formed from a cloth member in the same manner as the second chamber part 38. The introduction tube 45 is positioned so as to be set apart from the pocket part 47, and extends toward the longest direction of the second chamber part 38 so as to taper from the proximal end part 45a to a distal end part 45b when the airbag 31 is deployed. The introduction tube 45 has a function as a one-way valve for preventing gas from flowing out from the gas release part 46 when the second chamber part 38 is deployed and the inner pressure increases.

As described above, in order to avoid interference with the pocket part 47 when the second chamber part 38 is deployed, the introduction tube 45 is disposed so as to be set apart from the pocket part 47, and the distal end part 45b of the introduction tube 45 is positioned behind the pocket part 47. Gas can thereby be made to flow with minimal restriction into the rear of the pocket part 47. In other words, the second chamber part 38 can reliably pass over the backrest part 24 of the child seat 23, which is an obstacle.

The distal end part 45a of the introduction tube 45 is designed so as to be set apart from the inner surface of the second chamber part 38 when the second chamber part 38 is deployed. Therefore, the second chamber part 38 can be prevented from deploying to an unnecessary vertical length when deployed, and can be deployed in a stable manner.

Figure 9:
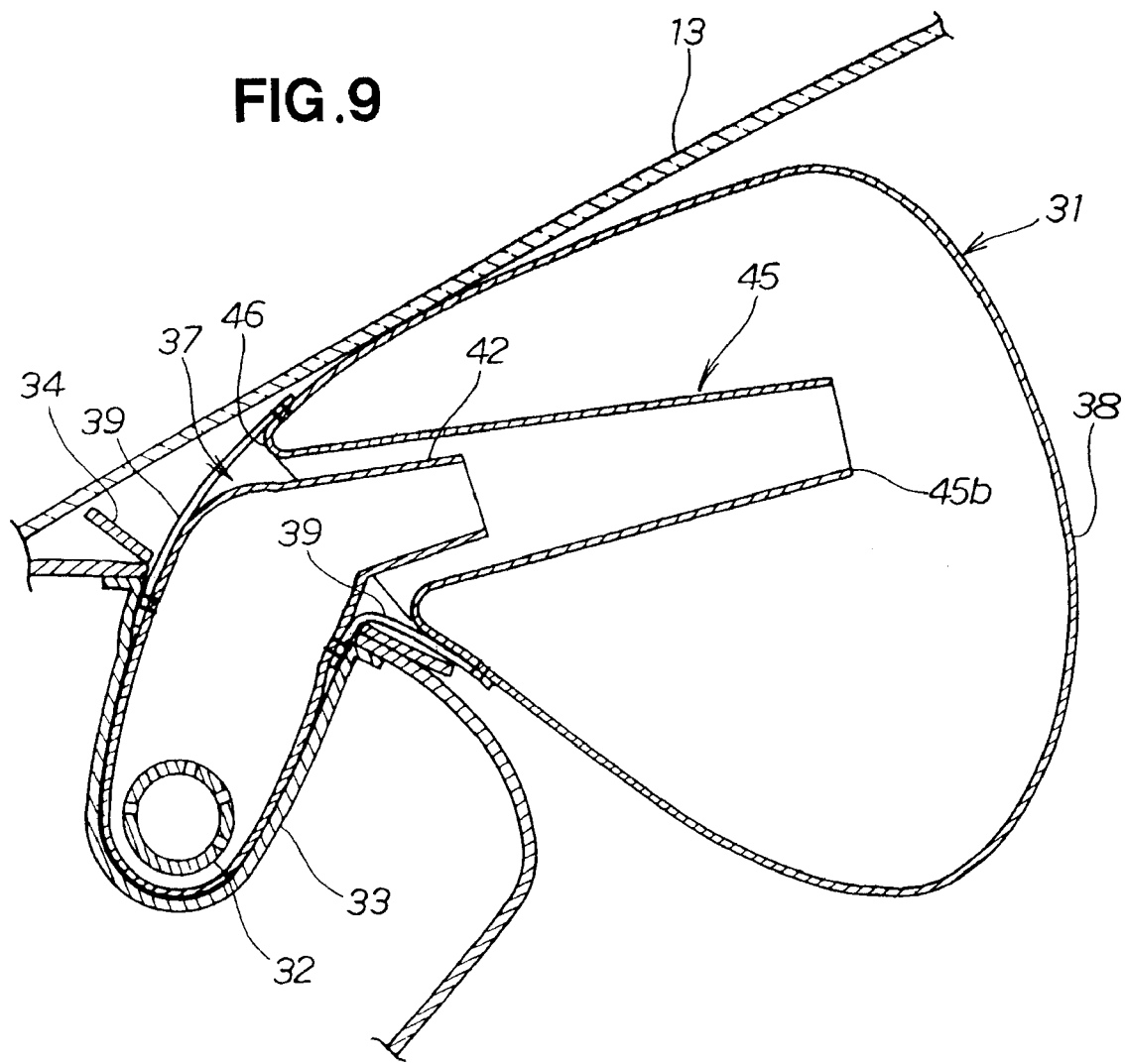
FIG. 9 is a cross-sectional view of the airbag device, showing a state in which a shear portion of the introduction tube shown in FIG. 8 is fully stretched.

As illustrated in FIG. 9, when the second chamber part 38 is unable to pass over the backrest part 24 (FIG. 1) of the child seat 23, the distal end part 45b of the introduction tube 45 will be blocked by an inner surface of the second chamber part 38, and gas supplied from the first chamber part 37 will be released to the exterior from the gas release part 46.

The gas release part 46 is formed between the first chamber part 37 and the second chamber part 38; therefore, the gas release part 46 may be formed in a gap portion between the first chamber part 37 and second chamber part 38, and the structure of the airbag 31 can be simplified.

The connecting bands 39 are formed using a cloth member, and are provided so as to extend along the inner peripheral surface of the lid 34.

FIGS. 4A through 4E show the airbag device shown in FIG. 2 in a standby state and a deployment state when a child seat has not been installed in the occupant seat 22.

Figure 4A:
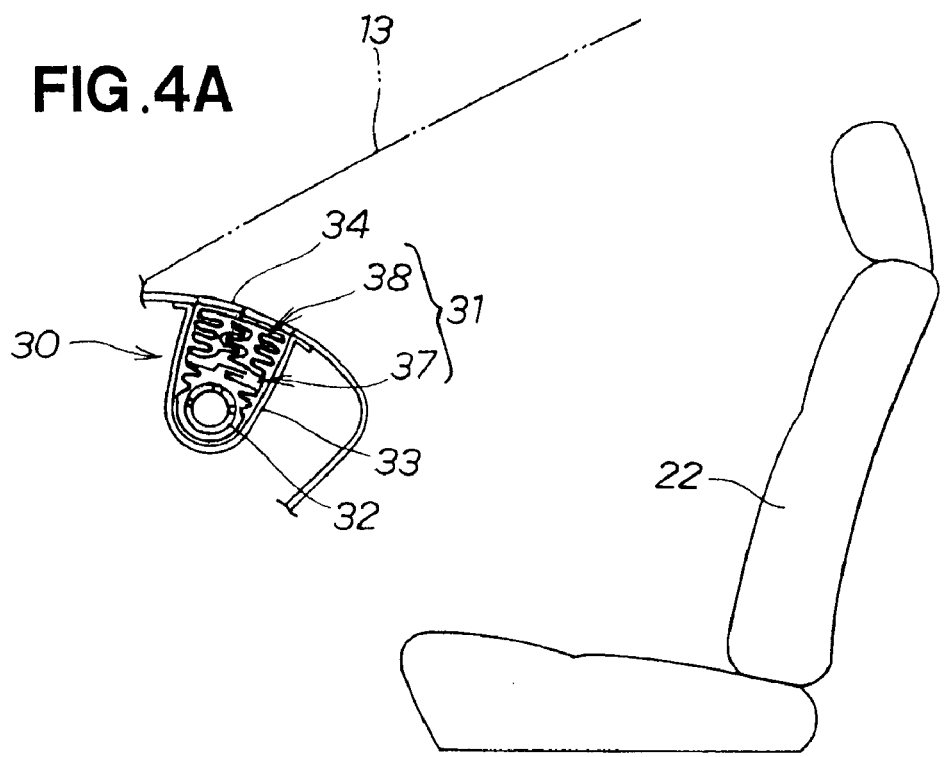
FIG. 4A through FIG. 4E are views showing a state in which the airbag of the present embodiment deploys toward the occupant seat.

In FIG. 4A, the airbag device 30 is in a standby state, wherein the inflator 32, the folded first chamber part 37, and the second chamber part 38, which is folded on top of the first chamber part 37, are accommodated atop one another inside the case 33, which is covered by the lid 34.

Figure 4B:
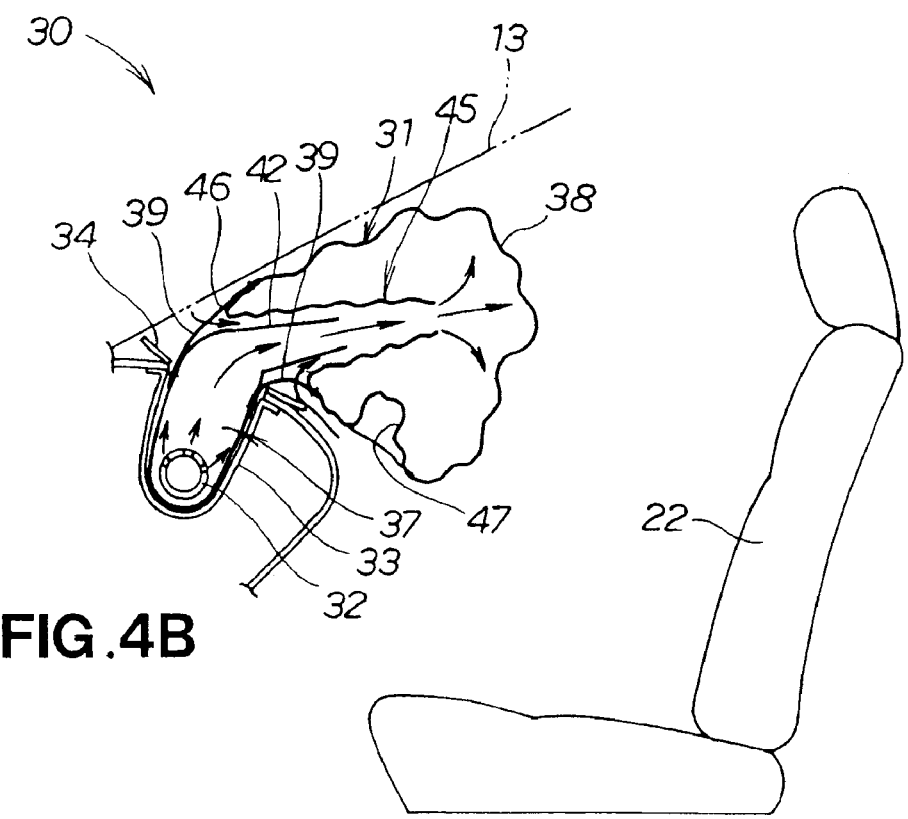

FIG. 4B shows an initial deployment state in which the inflator 32 is operated and gas is emitted.

First, the first chamber part 37 is deployed, and the lid 34 is broken by the first chamber part 37. The secondary introduction tube 42 of the first chamber part 37 enters the introduction tube 45 of the second chamber part 38.

The gas emitted by the inflator 32 is supplied into the second chamber part 38 via the first chamber part 37 and the introduction tube 45, and the second chamber part 38 begins to be deployed.

If outside air is then suctioned into the introduction tube 45 from the gas release part 46 formed in the gap between the introduction tube 42 and the introduction tube 45, the amount of gas generated by the inflator 32 will be reduced, which is a preferred arrangement.

The airbag 31 has the first chamber part 37, which is disposed between the inflator 32 and the introduction tube 45; and the second chamber part 38, which comes into contact with an object that is to be protected. Therefore, the gas emitted by the inflator 32 accumulates in the first chamber part 37, and is subsequently supplied to the second chamber part 38 via the introduction tube 45. The second chamber part 38, which comes into contact with an object to be protected, is deployed with minimal restriction.

Figure 4C:
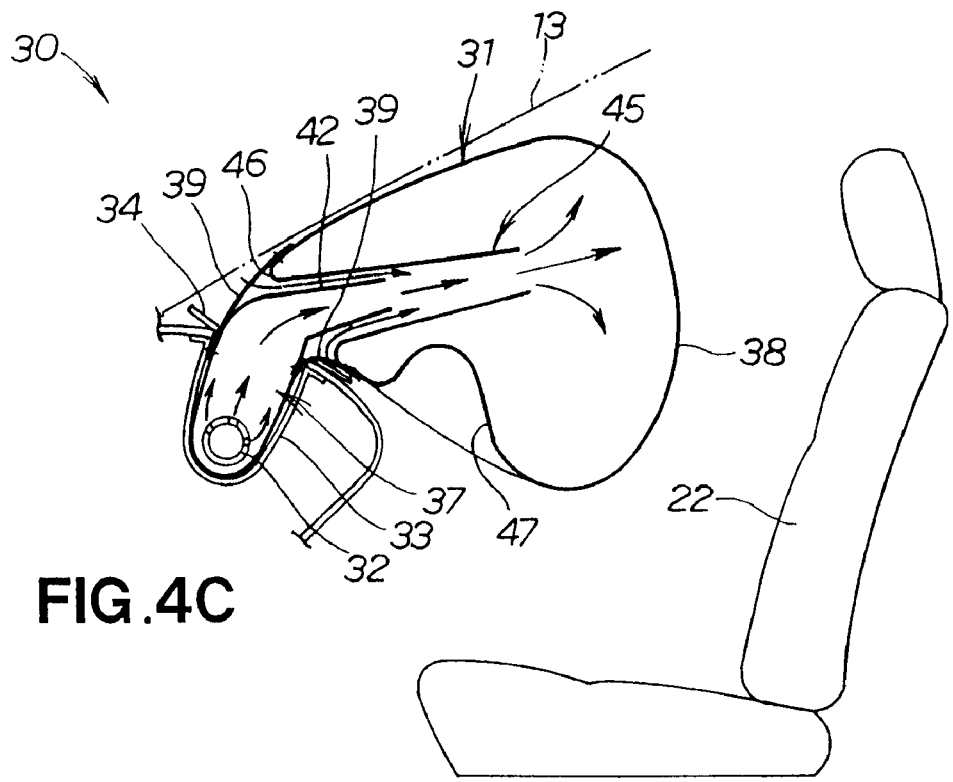
Figure 4D:
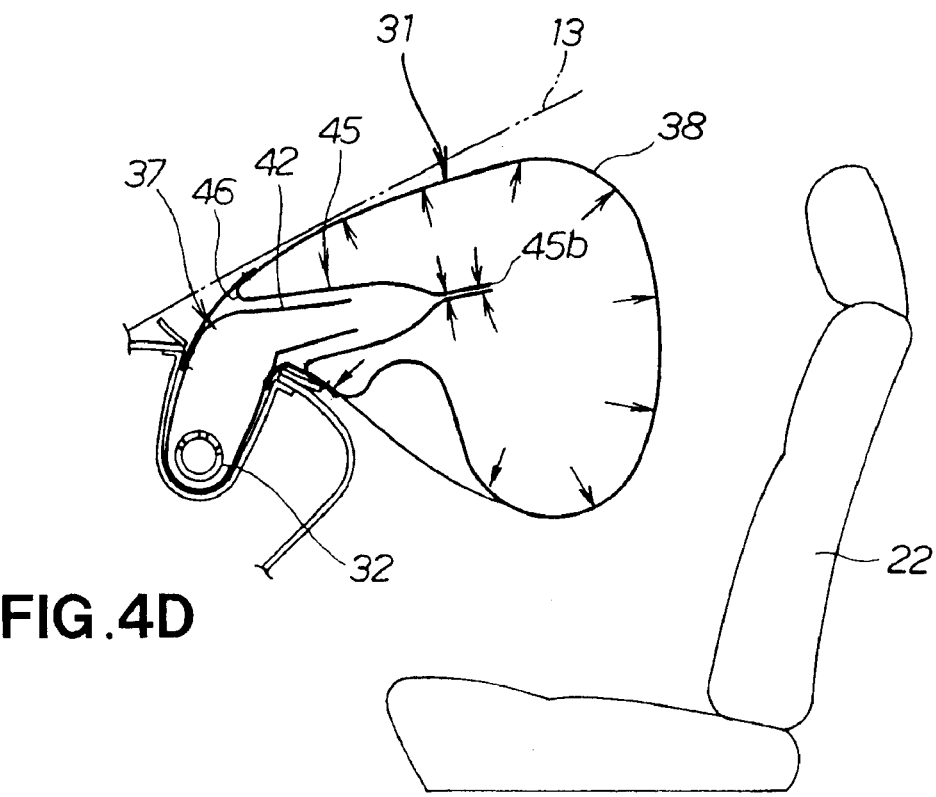

FIG. 4C and FIG. 4D show the airbag in a state of being deployed and a state of having been deployed.

As shown in FIG. 4C, the gas emitted by the inflator 32 is supplied to the second chamber part 38 via the introduction tube 45. Outside air is supplied to the second chamber part 38 while being suctioned into the introduction tube 45 from the gas release part 46, whereby the second chamber part 38 is deployed. In this step, the pressure inside the first chamber part 37 toward the inflator 32 and inside the introduction tube 45 is higher than the pressure inside the second chamber part 38.

In FIG. 4D, when the second chamber part 38 has finished being deployed and the amount of gas emitted by the inflator 32 decreases, the pressure inside the second chamber part 38 will be higher than the pressure inside the first chamber part 37 toward the inflator 32 and inside the introduction tube 45. The pressure inside the first chamber part 37 and the introduction tube 45 will be substantially near atmospheric pressure since communication with the outside air is achieved via the gas release part 46.

The introduction tube 45 is formed using a cloth member, as described above. Therefore, when the pressure inside the second chamber part 38 is higher than the pressure inside the first chamber part 37 and inside the introduction tube 45, as also described above, tension will be lost, the distal end part 45b of the introduction tube 45 will close, and the pressure inside the second chamber part 38 will be maintained.

Specifically, the introduction tube 45 has a function as a one-way valve for preventing gas from flowing out of the gas release part 46 when the internal pressure increases after the airbag 31 has been deployed. Therefore, the internal pressure inside the airbag 31 is maintained until an object that is to be protected comes into contact with the airbag 31.

Figure 4E:
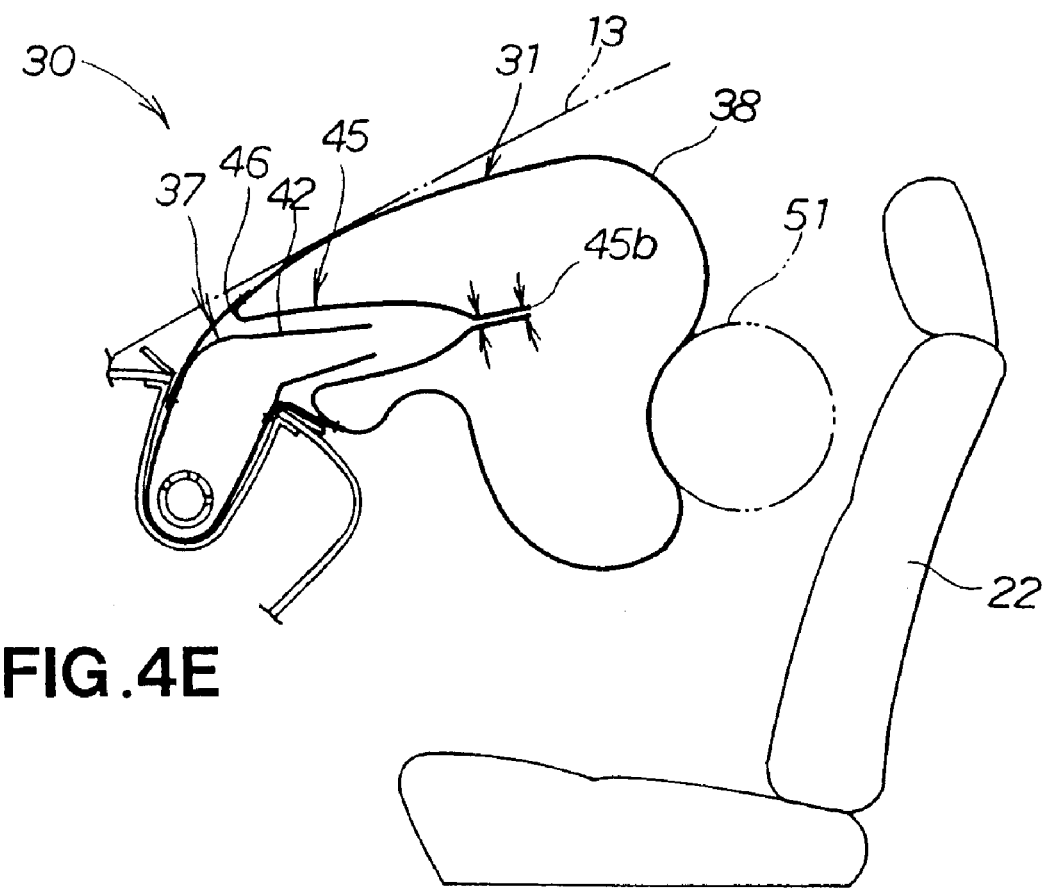

FIG. 4E shows a state in which an occupant 51 comes into contact with the airbag 31.

The deployed second chamber part 38 restrains the occupant 51 (the object to be protected) riding in the passenger seat 22, and absorbs the impact imparted to the occupant 51.

The second chamber part 38 (airbag 31) has the introduction tube 45, which has a function as a one-way valve for preventing gas from flowing out of the gas release part 46, as described above. Therefore, the internal pressure of the second chamber part 38 can be sufficiently maintained until the occupant 51 comes into contact with the second chamber part 38, and the occupant is appropriately protected.

FIGS. 5A through 5D show a state in which the airbag shown in FIG. 2 is deployed when the child seat 23 has been installed in the passenger seat 22.

Figure 5A:
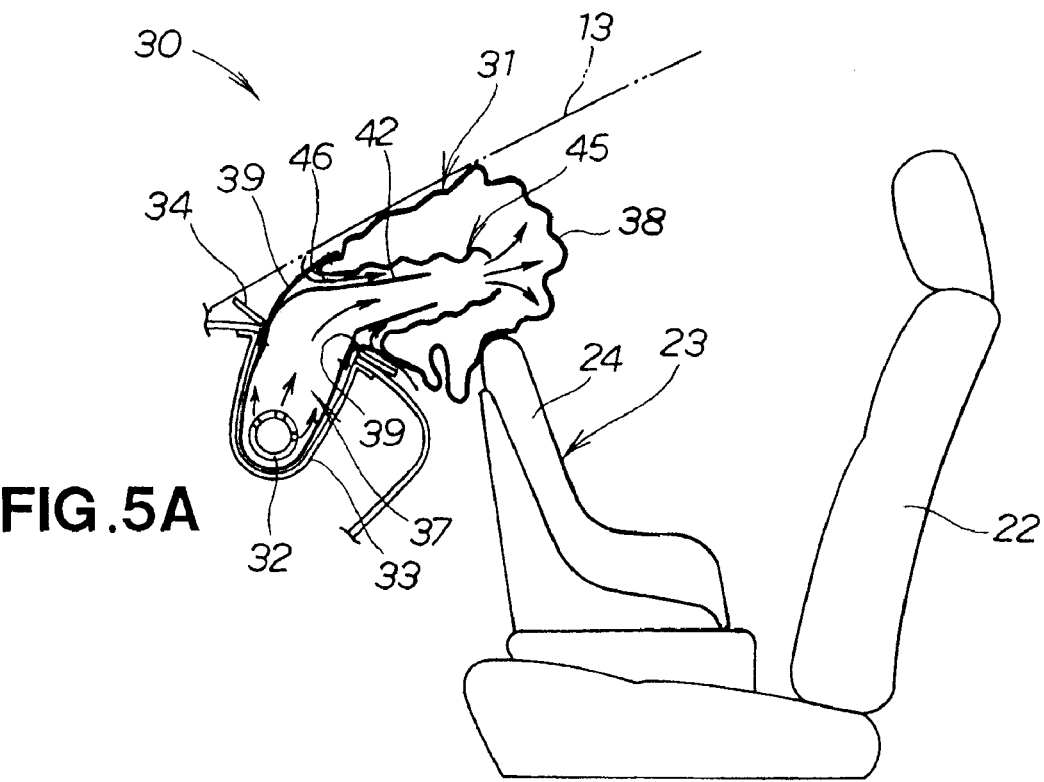
FIG. 5A through FIG. 5D are views showing a state in which the airbag deploys when a child seat is attached to the occupant seat so as to be facing backward.

In FIG. 5A, when the inflator 32 is operated and gas for deploying the airbag is emitted, first, the first chamber part 37 is deployed, and the lid 34 is broken by the first chamber part 37. The secondary introduction tube 42 of the first chamber part 37 enters the introduction tube 45 of the second chamber part 38.

The gas emitted by the inflator 32 is supplied to the second chamber part 38 via the first chamber part 37 and the introduction tube 45. The second chamber part 38 deploys towards the child seat 23 attached to the passenger seat 22. Outside air is suctioned into the introduction tube 45 from the gas release part 46.

Figure 5B:
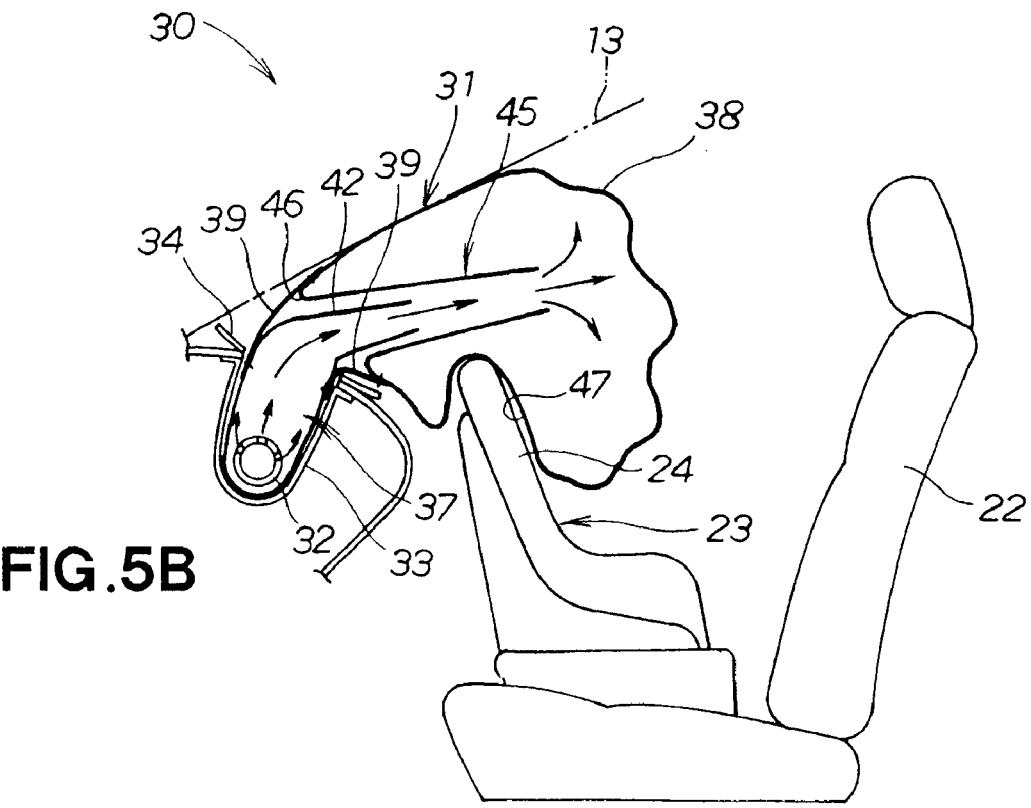

In FIG. 5B, the second chamber part 38 is also deployed by the gas. At this stage, the second chamber part 38 ordinarily passes over the backrest part 24 of the child seat 23, and the backrest part 24 fits in the pocket part 47 of the second chamber part 38.

Figure 5C:
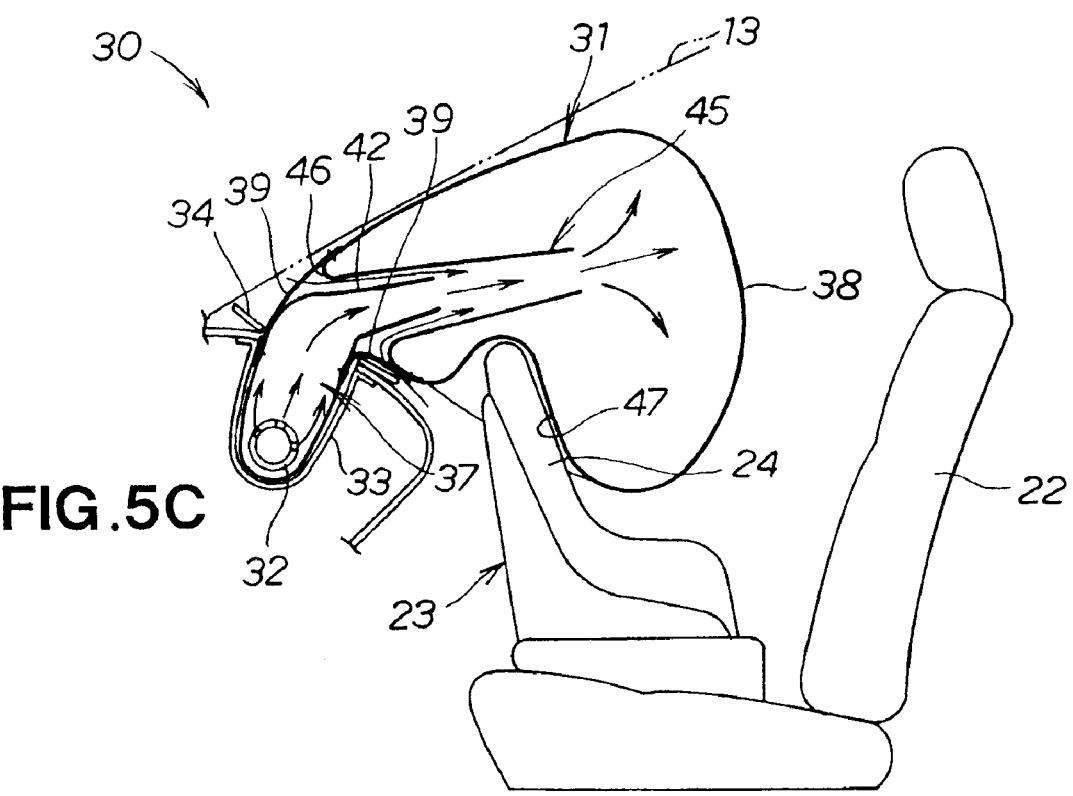

In the FIG. 5C, after the backrest part 24 has been fitted into the pocket part 47 of the second chamber part 38, gas is further supplied to the second chamber part 38. In this stage, the pressure inside the first chamber part 37 toward the inflator 32 and inside the introduction tube 45 is higher than the pressure inside the second chamber part 38. The backrest part 24 of the child seat 23 is covered by the pocket part 47 of the inflator 32.

Figure 5D:
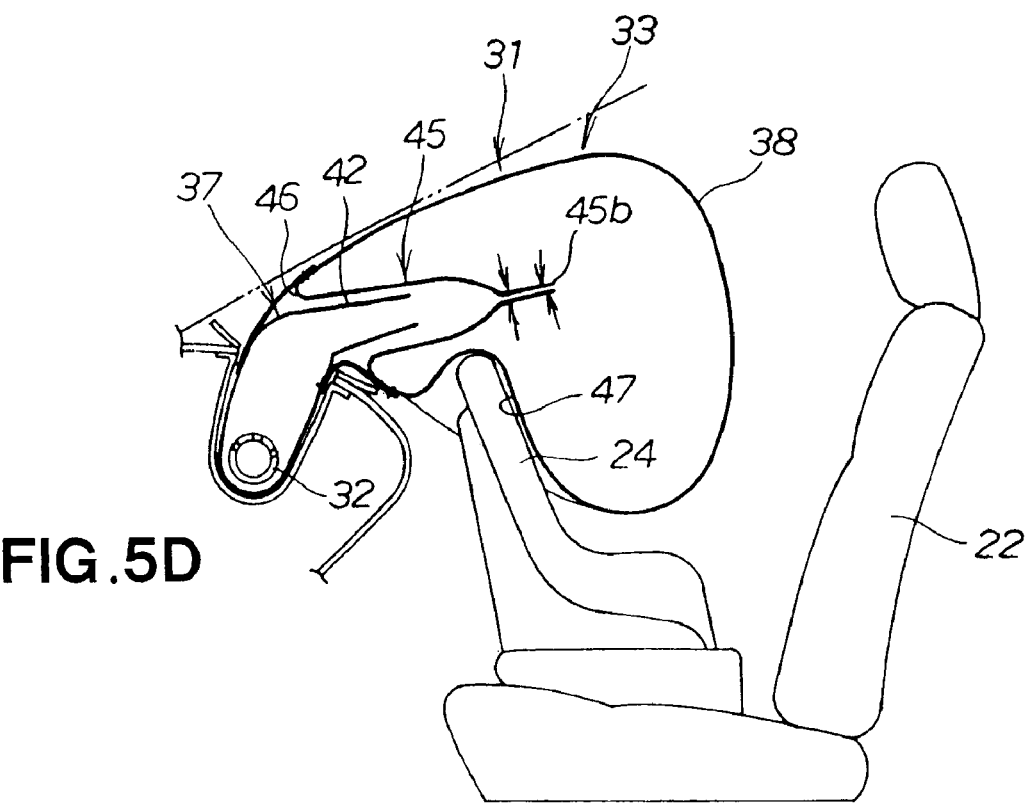

As shown in FIG. 5D, when the second chamber part 38 has finished deploying, the amount of gas emitted by the inflator 32 decreases. The pressure in the second chamber part 38 is higher than the pressure inside the first chamber part 37 toward the inflator 32 and inside the introduction tube 45.

The pressure inside the first chamber part 37 and the introduction tube 45 is substantially near atmospheric pressure since communication with the outside air is obtained via the gas release part 46.

The introduction tube 45 is formed using a cloth member, as described above. Therefore, when the pressure inside the second chamber part 38 is higher than the pressure inside the first chamber part 37 and the introduction tube 45, the distal end part 45b of the introduction tube 45 will close, the pressure inside the second chamber part 38 will be maintained, and the airbag 31 will be completely deployed.

Figure 6A:
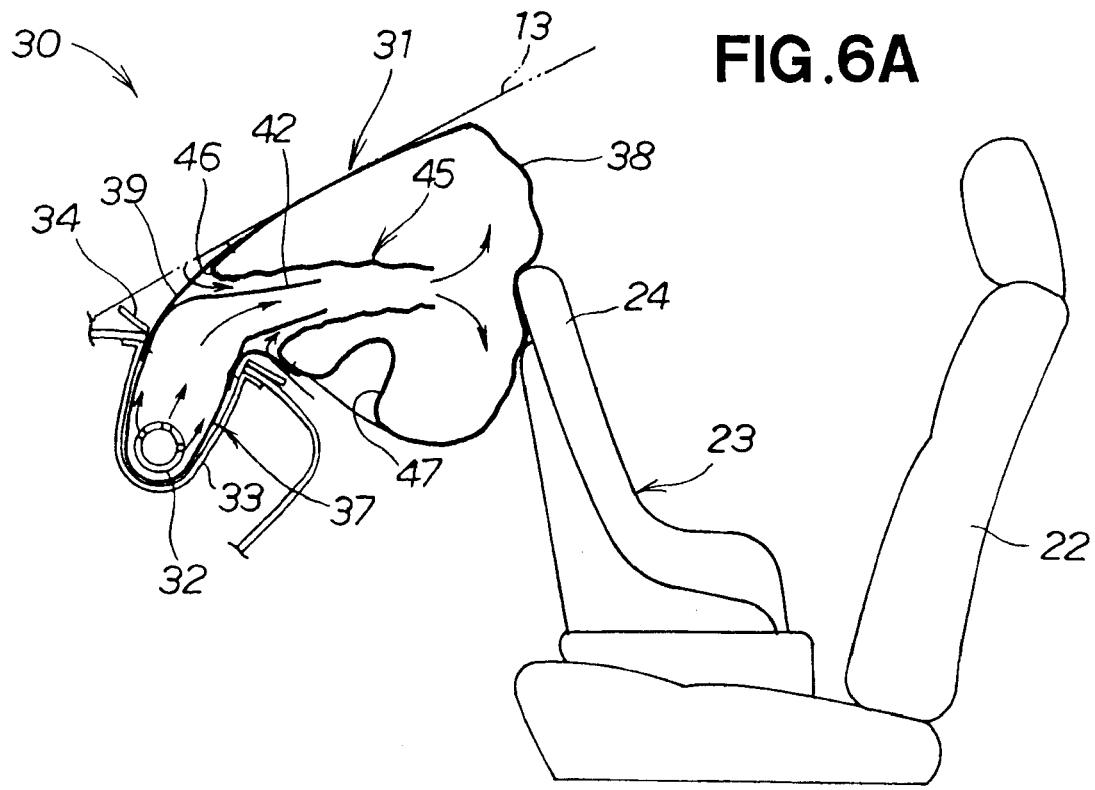
FIG. 6A and FIG. 6B are views showing a state in which a backrest of the child seat is acting as an obstruction, and the airbag is not completely deployed.
Figure 6B:
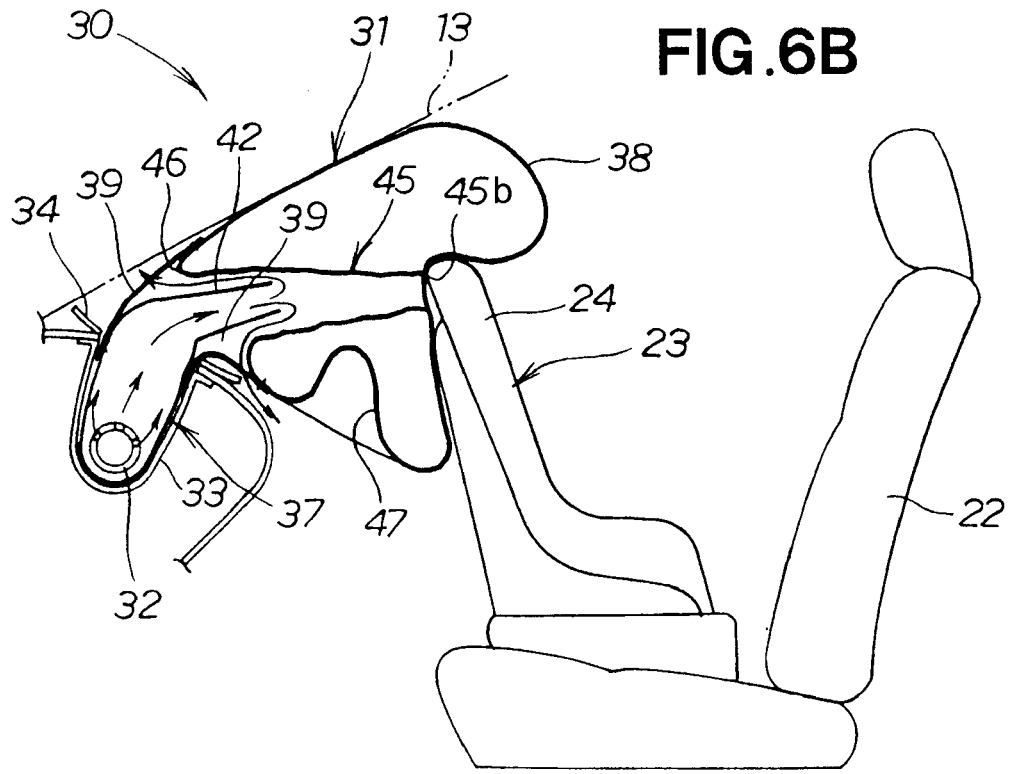

FIGS. 6A and 6B show a state in which the second chamber part 38 is kept from deploying by the child seat 23 and the backrest part 24 when the airbag 31 is deployed.

When the child seat 23 is installed in the passenger seat 22 so as to face rearward, the second chamber part 38 will pass over the backrest part 24 of the child seat 23, and the backrest part 24 will fit into the pocket part 47 of the second chamber part 38, as shown in FIG. 5B. However, since the child seat 23 is not a part that is unique to the vehicle, a variety of child seats 23 may be attached to the passenger seat 22. The second chamber part 38 may not be able to pass over the upper end of the backrest part 24; e.g., when the child seat 23 has a high backrest part 24.

As shown in FIG. 6A, first, the first chamber part 37 is deployed by the gas from the inflator 32, and the lid 34 is broken by the first chamber part 37. The secondary introduction tube 42 of the first chamber part 37 enters the introduction tube 45 of the second chamber part 38. The gas emitted by the inflator 32 via the introduction tube 45 causes the second chamber part 38 to be deployed toward the child seat 23 attached to the passenger seat 22. The second chamber part 38 will impact the backrest part 24, and the second chamber part 38 will not be able to pass over the upper end of the backrest part 24 if, at this time, the child seat 23, e.g., has a high backrest part 24.

As shown in FIG. 6B, gas is further supplied to the second chamber part 38, and the second chamber part 38 is deployed. The distal end part 45b of the introduction tube 45 thereby comes into contact with an inner surface of the second chamber part 38, and the introduction tube 45 is blocked. The gas emitted by the inflator 32 is released in the atmosphere from the gas release part 46 via the secondary introduction tube 42 of the first chamber part 37. Specifically, the second chamber part 38 can be deployed to a lesser extent. As a result, the backrest part 24 of the child seat 23 can be supported at a constant pressure.

As described above, the airbag device 30 has an introduction tube 45 extending into the airbag 31 for introducing gas into the airbag 31 from the inflator 32; and a gas release part 46 for releasing the gas when the distal end part 45b of the introduction tube 45 is blocked off by the airbag 31.

Specifically, when the airbag 31 cannot pass over the upper end of the backrest part 24 of the child seat 23, the airbag 31 will come into contact with the backrest part 24 of the child seat 23, the distal end part 45b of the introduction tube 45 will be blocked off by the airbag 31, and gas emitted from the inflator 32 will escape from the gas release part 46. The airbag 31 is thereby deployed to a lesser extent in a state in which the airbag 31 comes into contact with the backrest part 24 of the child seat 23. As a result, it is possible to prevent the child seat 23 from being pushed further backward than necessary, and the backrest part 24 of the child seat 23 can be supported at a fixed pressure.

FIGS. 7 through 10 show a state in which a folded part 45c, which is a lateral portion of the distal end part 45b of the tapered introduction tube 45, is folded into the introduction tube 45, and the introduction tube 45 is folded.

As shown in FIG. 2 and FIG. 3, the introduction tube 45 is formed so as to taper towards the direction in which the second chamber part 38 deploys. Therefore, the folded part 45c, which is a lateral portion of the distal end portion 45b of the introduction tube 45, can be readily folded into the introduction tube 45. Reference number 45d is a crease part.

As shown in FIG. 9, the folded part 45c of the introduction tube 45 unfolds and extends toward the direction in which the second chamber part 38 deploys when the second chamber part 38 is deployed by the gas emitted by the inflator 32.

Figure 7:
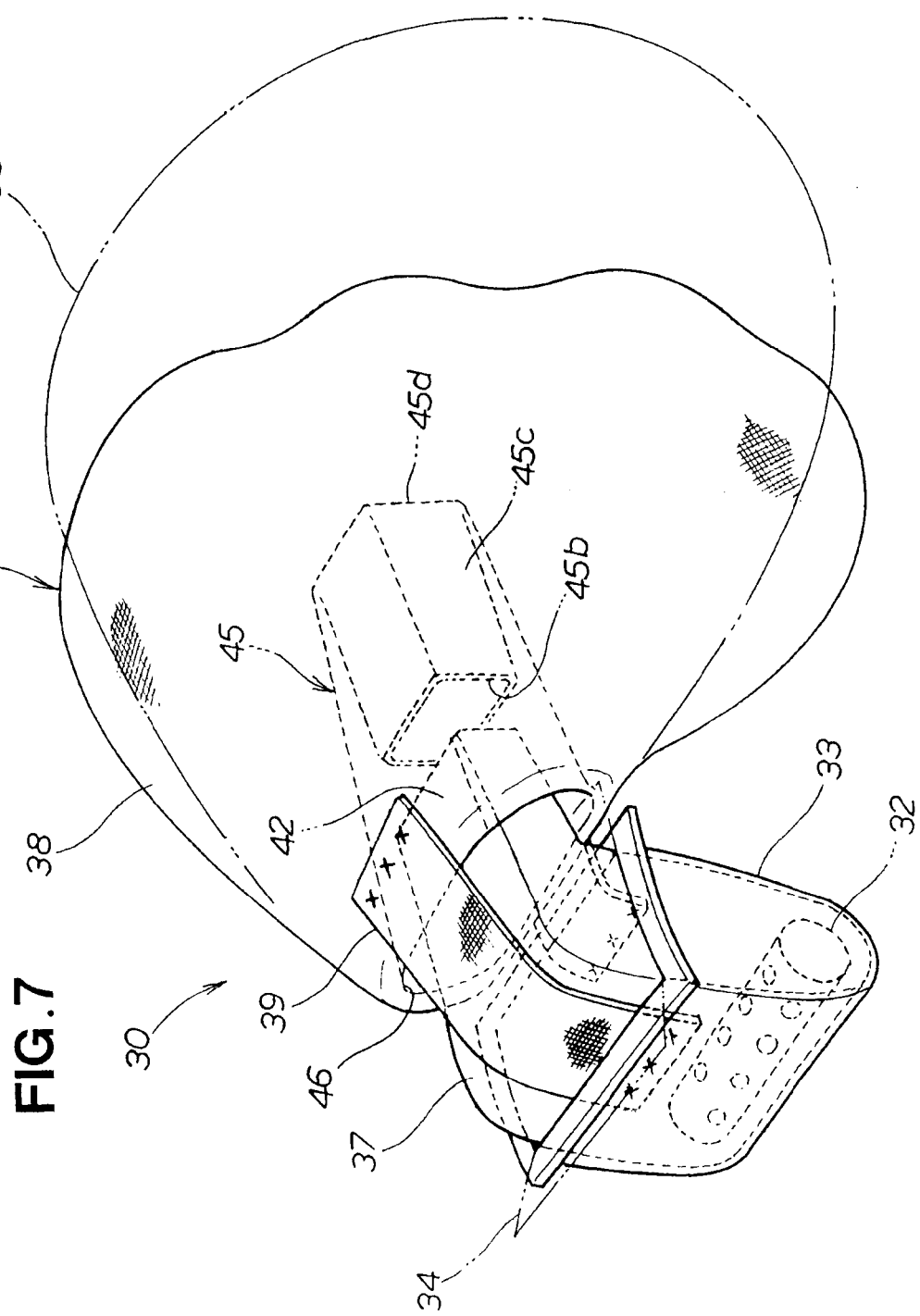
FIG. 7 is a perspective view of the airbag device in a state in which a distal end portion of an introduction tube is folded into the introduction tube.
Figure 8:
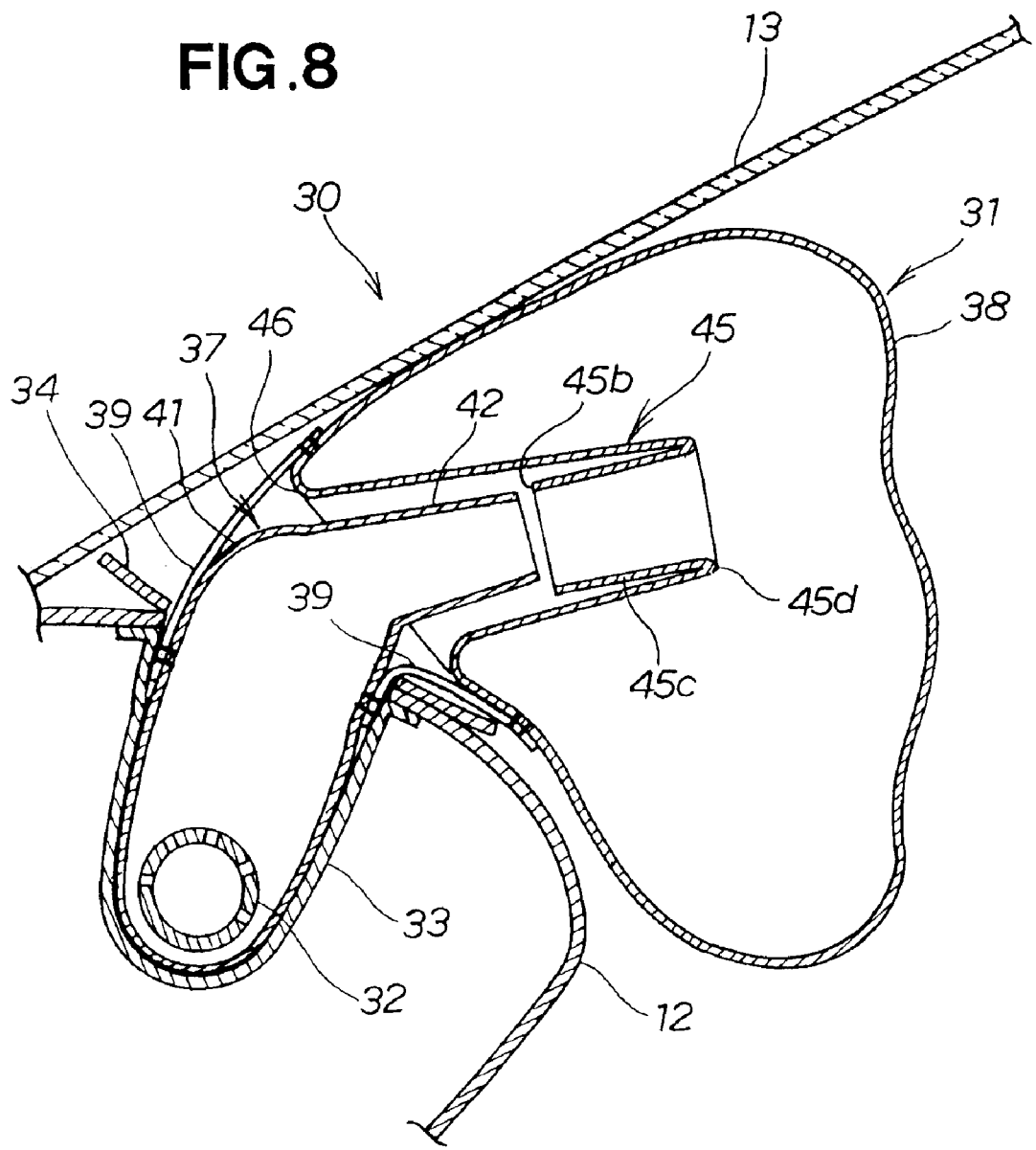
FIG. 8 is a cross-sectional view of the airbag device shown in FIG. 7.

A state in which the airbag 31 shown in FIG. 7 and FIG. 8 is about to be deployed will be described hereafter with reference to FIGS. 10A through 10F.

Figure 10A:
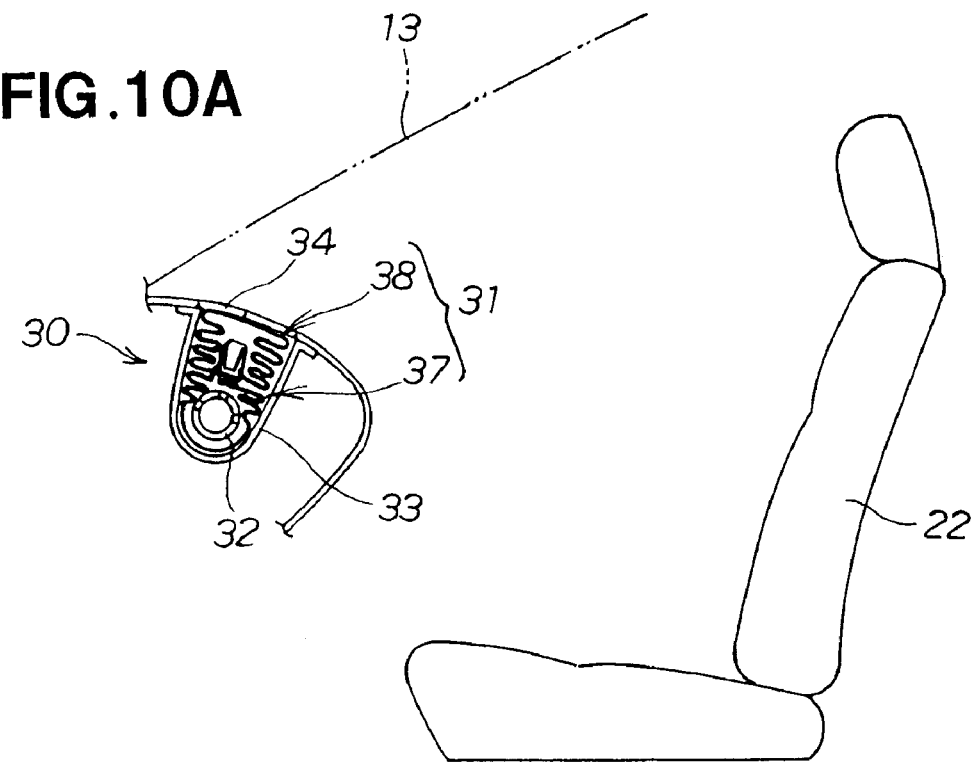
FIG. 10A through FIG. 10F are views showing a state in which the airbag of the airbag device shown in FIG. 8 is expanded.

As shown in FIG. 10A, the airbag device 30 is in a standby mode in a state wherein the inflator 32, the folded first chamber part 37, and the second chamber part 38, which is folded on top of the first chamber part 37, are accommodated on top of one another in the case 33, and are covered with the lid 34.

Figure 10B:
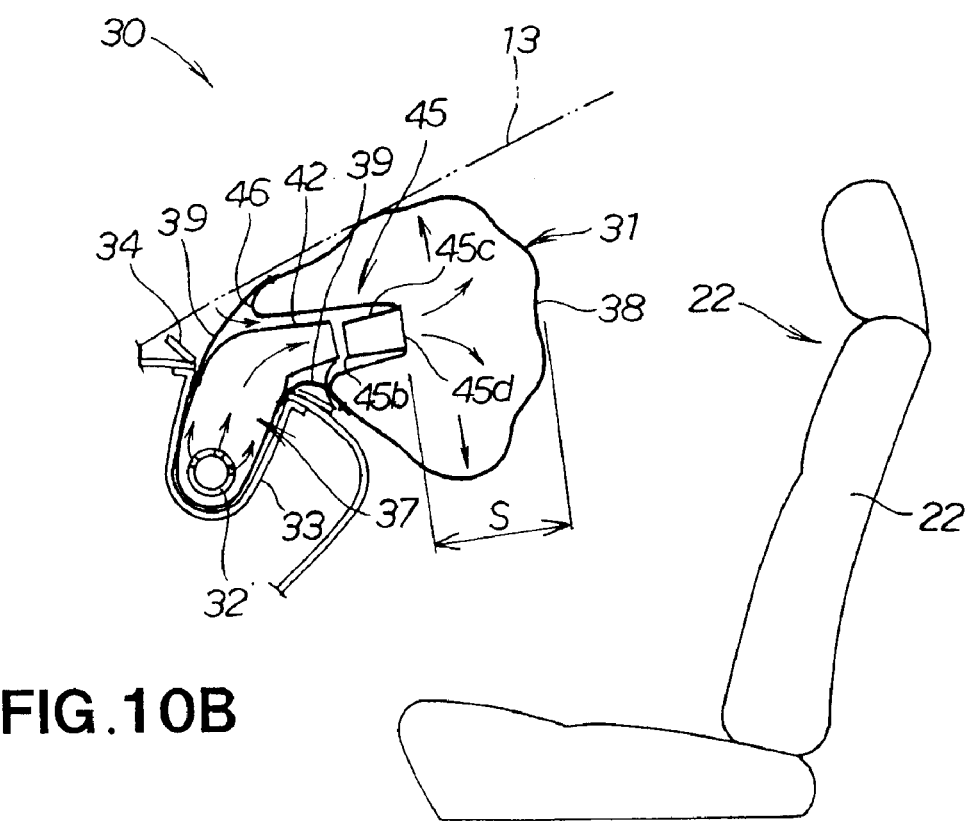

FIG. 10B shows an initial deployment state, in which the inflator 32 is operated and gas is emitted.

First, the first chamber part 37 deploys, and breaks the first chamber part 37. The secondary introduction tube 42 of the first chamber part 37 enters the introduction tube 45 of the second chamber part 38.

The gas emitted by the inflator 32 is supplied to the second chamber part 38 via the first chamber part 37 and the introduction tube 45, and the second chamber part 38 begins to deploy.

The distal end part 45b of the introduction tube 45 is folded so as to be positioned in the introduction tube 45 at this time; therefore, the introduction tube 45 can be reliably set apart from an inner surface of the second chamber part 38.

Specifically, a considerable distance S can be maintained, where S is the distance between the crease part 45d of the folded introduction tube 45 and the inner surface of the second chamber part 38. As a result, the gas can be discharged in a radial pattern toward the inner peripheral surface of the second chamber part 38, and the second chamber part 38 can be prevented from deploying to an unnecessary vertical length when deployed. Furthermore, even during deployment, the second chamber part 38 will deploy according to the exterior shape of the second chamber part 38 when fully deployed.

Figure 10C:
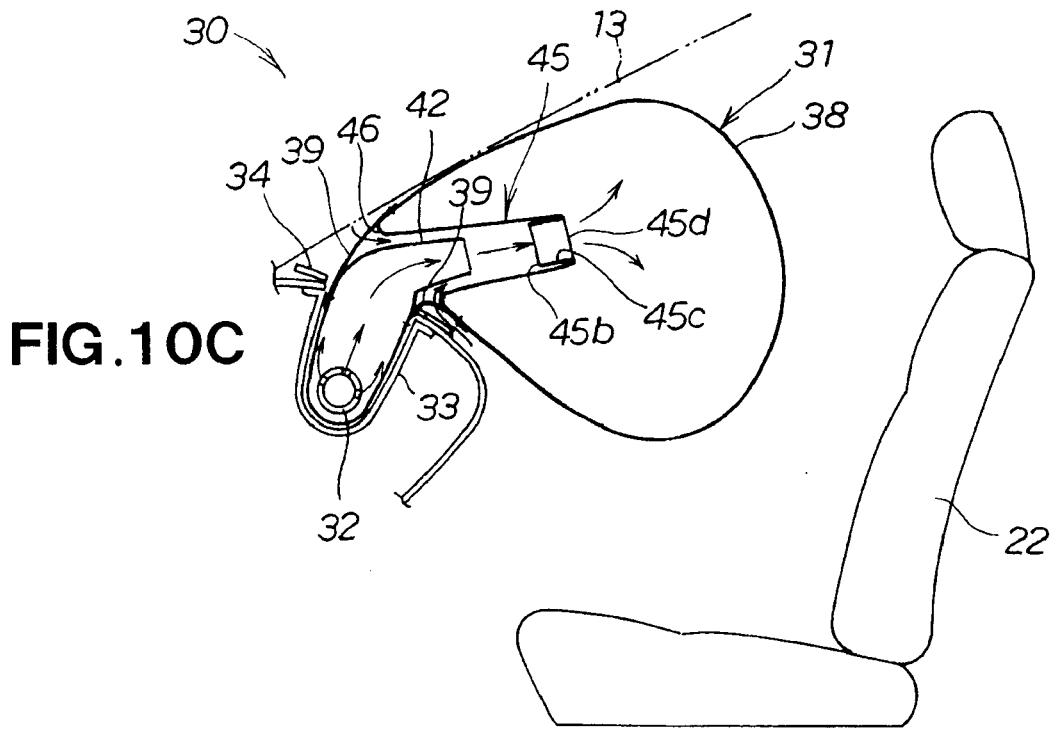

As shown in FIG. 10C, when gas is supplied to the second chamber part 38, the folded part 45c extends and becomes smaller, and the gas pressure extends the introduction tube 45 in the direction of deployment of the second chamber part 38.

Figure 10D:
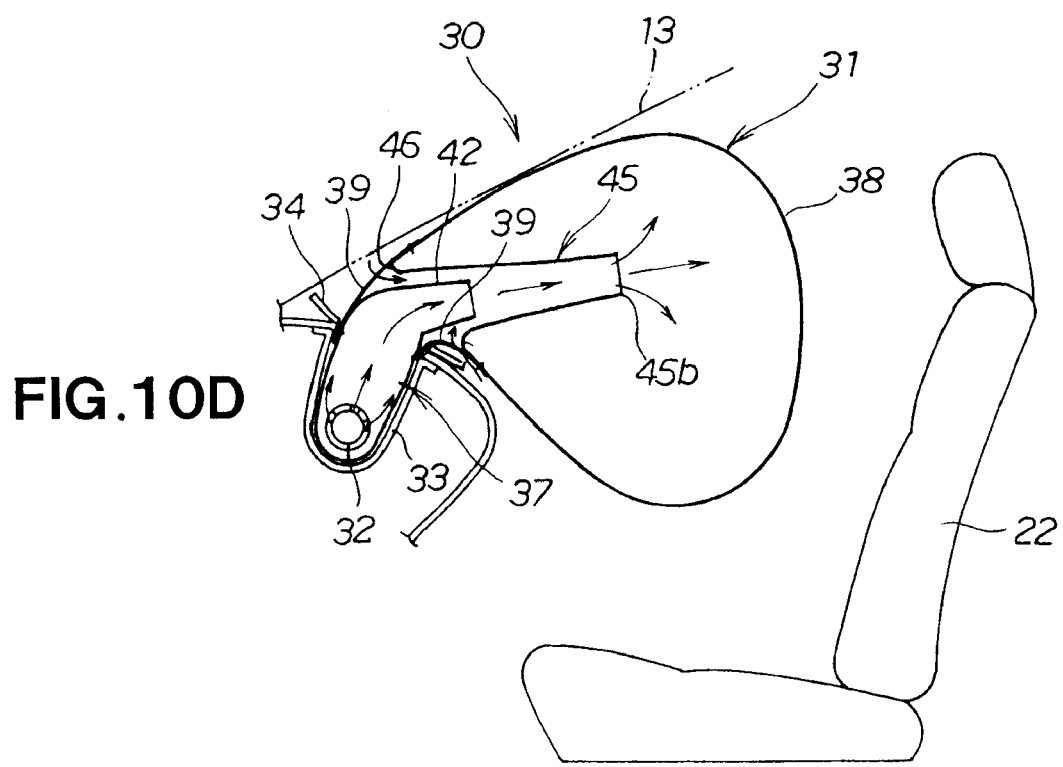

Furthermore, when gas is supplied to the second chamber part 38 from the inflator 32 as shown in FIG. 10D, a distal end portion (folded part 45c) of the introduction tube 45 will become fully extended, and the introduction tube 45 will have a linear shape. At this stage, the pressure inside the first chamber part 37 toward the inflator 32 and inside the introduction tube 45 will be higher than in second chamber part 38.

Figure 10E:
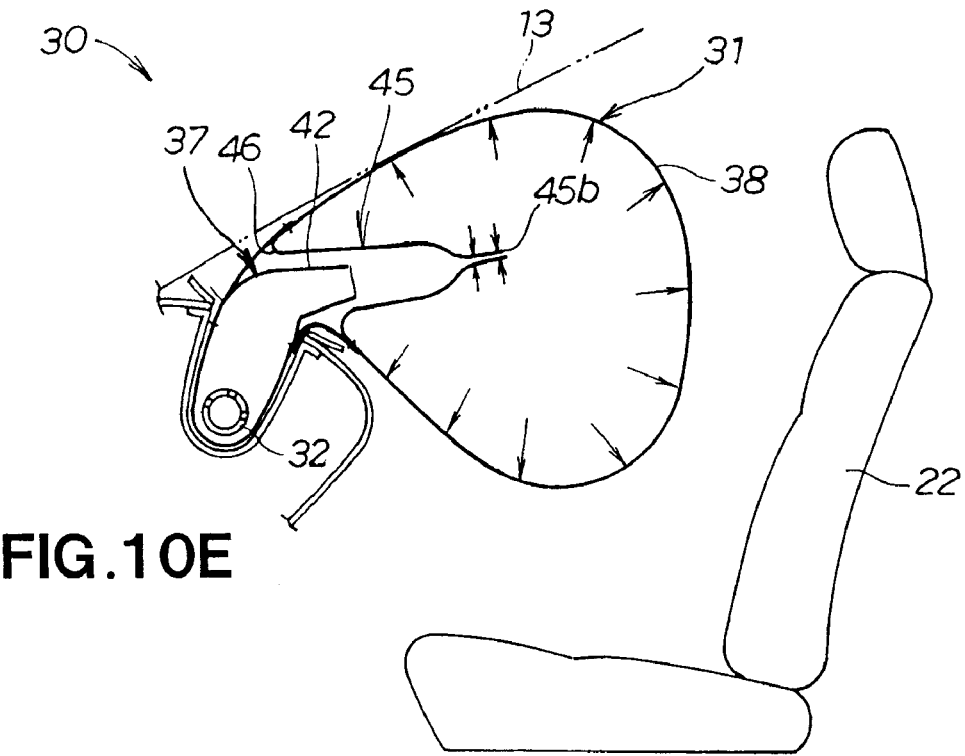

In FIG. 10E, when the second chamber part 38 has finished deploying and the amount of gas emitted by the inflator 32 decreases, the pressure inside the second chamber part 38 will be higher than the pressure inside the first chamber part 37 towards the inflator 32 and inside the introduction tube 45. The pressure inside the first chamber part 37 and inside the introduction tube 45 will be substantially near atmospheric pressure since the first chamber part 37 and the introduction tube 45 communicate with the outside air via the gas release part 46.

The introduction tube 45 is formed using a cloth member as described above. Therefore, when the pressure inside the second chamber part 38 is higher than the pressure inside the first chamber part 37 and the introduction tube 45, tension will be lost, the distal end part 45b of the introduction tube 45 will close, and the pressure inside the second chamber part 38 will be maintained, as described above.

Specifically, since the introduction tube 45 has a function as a one-way valve for preventing gas from flowing out from the gas release part 46 when the internal pressure increases after the airbag 31 deploys, the internal pressure inside the airbag 31 will be maintained until an object that is to be protected comes into contact with the airbag 31.

Figure 10F:
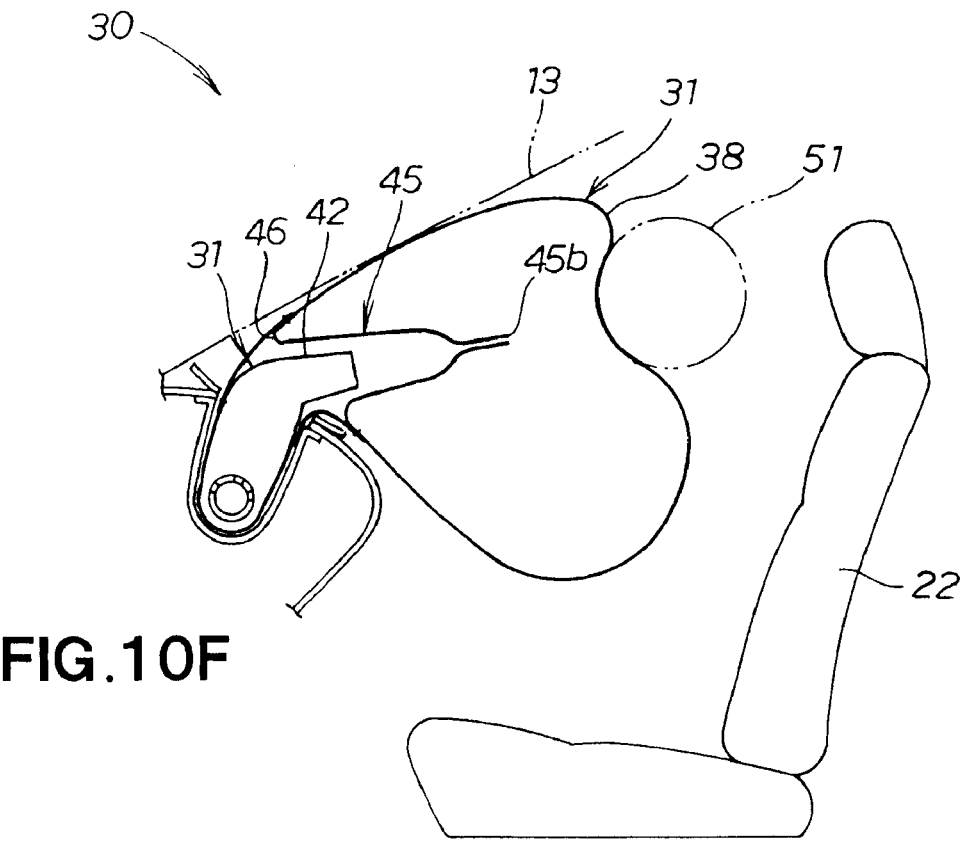

FIG. 10F shows a state in which the airbag 31 comes into contact with an occupant 51.

The fully deployed second chamber part 38 restrains the occupant 51 (the object to be protected) who is occupying the passenger seat 22, and absorbs the impact imparted to the occupant 51.

As described above, the second chamber part 38 (airbag 31) has the introduction tube 45, which has a function as a one-way valve for preventing gas from flowing out from the gas release part 46. Therefore, the internal pressure of the second chamber part 38 can be adequately maintained until the occupant 51 comes into contact with the second chamber part 38, and the occupant can be appropriately protected.

The airbag deploys in the same manner as that shown in FIG. 6A and FIG. 6B when a child seat has been installed in the passenger seat 22 so as face rearward, and the backrest part of the child seat is an obstacle.

Figure 11:
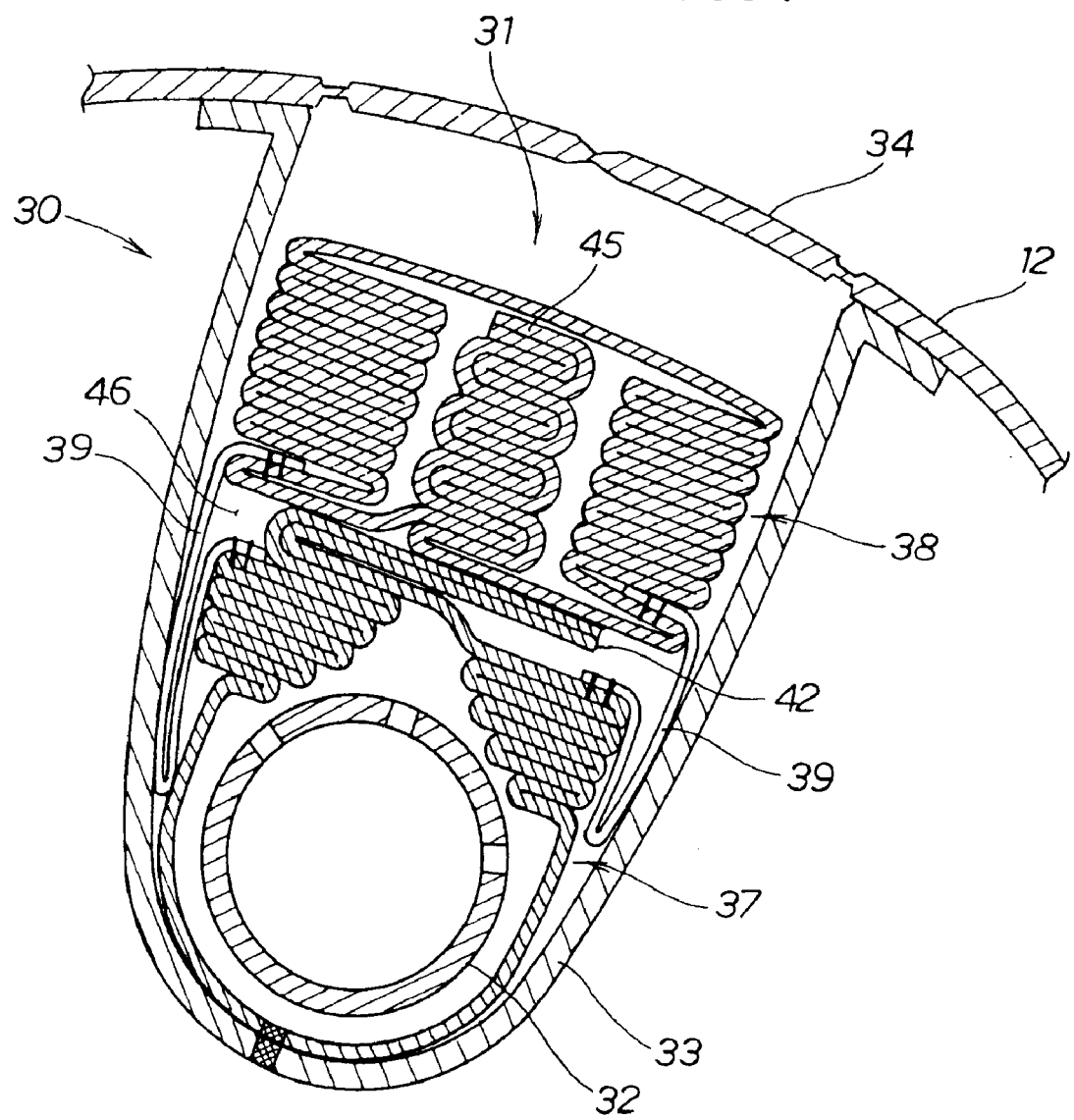
FIG. 11 is a cross-sectional view showing a state in which a first chamber part and a second chamber part of the airbag are folded and accommodated inside a case.

FIG. 11 shows a state in which the airbag 31 is folded and accommodated inside the case 33 along with the inflator 32.

Specifically, the lower part of the first chamber part 37 surrounds the inflator 32, and the upper portion is folded. The secondary introduction tube 42 is folded in the uppermost part of the first chamber part 37.

The connecting bands 39, 39 that connect the first chamber part 37 and the second chamber part 38 are folded in two, and are positioned between an inner surface of the case 33 and an exterior surface of the first chamber part 37. Therefore, the connecting bands 39, 39 restrict the first chamber part 37 from deforming when the airbag 31 is stowed.

The second chamber part 38 is folded onto the folded secondary introduction tube 42. Accordingly, the secondary introduction tube 42, which is folded in two, is accommodated inside the case 33 in a state in which the secondary introduction tube 42 is disposed between the folded first chamber part 37 and the second chamber part 38.

The periphery of the introduction tube 45 is positioned in the center of the folded second chamber part 38 in a state in which the introduction tube is folded in the longitudinal direction.

Specifically, the second chamber part 38 of the airbag 31 is folded and accommodated in the case 33 so as to lie on the folded first chamber part 37.

Figure 12:
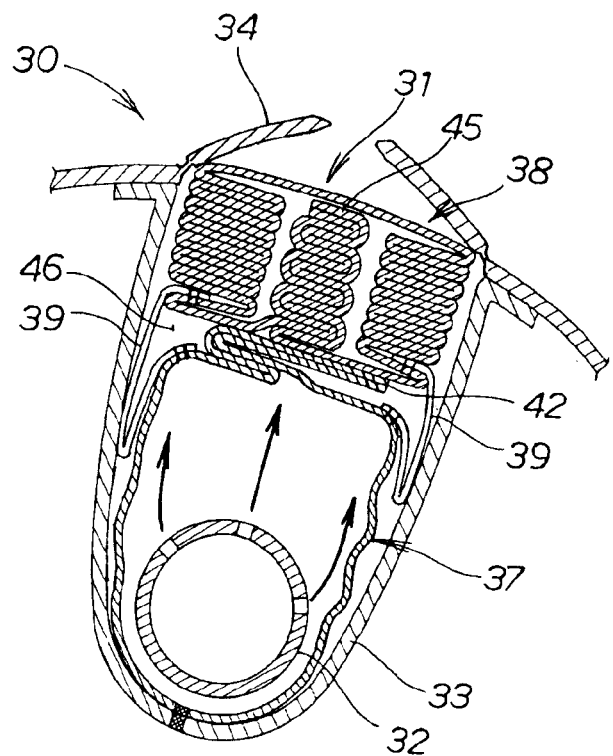
FIG. 12 is a cross-sectional view showing a state in which the first chamber part of the airbag has deployed from the accommodated state, and a lid is broken.
Figure 13:
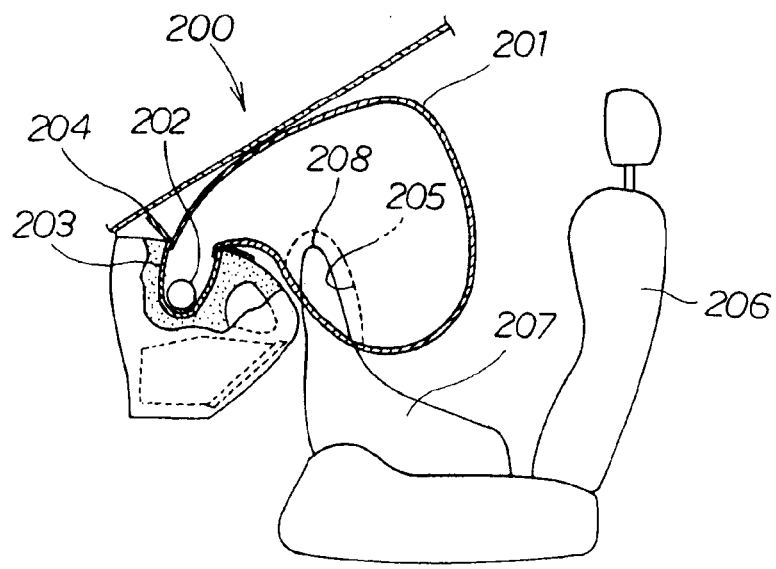
FIG. 13 is a partial cross-sectional view of a conventional airbag device.

FIG. 12 shows a state in which the lid 34 has been broken as a result of the first chamber part 37 being deployed.

As shown in FIG. 12, when the inflator 32 is operated and gas is emitted, first, the first chamber part 37 is deployed. At this time, the first chamber part 37 will still be blocked by the secondary introduction tube 42, which is folded in two. A closed space is accordingly formed. Therefore, the internal pressure inside the first chamber part 37 rapidly increases.

As a result of the deployment of the first chamber part 37, the folded second chamber part 38 is pushed upward, and the lid 34 is broken by the second chamber part 38. The second chamber part 38 is then deployed by the gas from the inflator 32 via the secondary introduction tube 42 and the introduction tube 45.

The second chamber part 38 thus deploys in two stages. Specifically, the initial rapid deployment of the first chamber part 37 quickly breaks the lid 34. Once the lid has been reliably opened, the airbag 31 deploys so that the second chamber part 38 conforms to the fully deployed shape. Therefore, according to the two-stage scheme airbag 31 of the present embodiment, the airbag 31 can be prevented from deploying vertically, unlike with single-stage airbags in which a single airbag is deployed once.

When the second chamber part 38 deploys, the folded connecting bands 39, 39, which connect the first chamber part 37 and the second chamber part 38, extend along the inner peripheral surface of the lid 34, as shown in FIG. 3. Therefore, second chamber part 38 will not come into direct contact with the lid 34, and will be protected by the connecting bands 39, 39.

The airbag device of the present embodiment may be appropriately provided with vent holes for allowing the internal pressure of the second chamber part 38 (airbag 31) to decrease when the occupant 51 is restrained.

Obviously, various minor changes and modifications of the present invention are possible in light of the above teaching. It is therefore to be understood that within the scope of the appended claims the invention may be practiced otherwise than as specifically described.

What is claimed is:

1. A vehicle airbag device comprising:
   an airbag designed to be deployed toward an occupant in a vehicle;
   an inflator for supplying to the airbag a gas for deploying the airbag;
   an introduction tube extending into the airbag for introducing the gas into the airbag from the inflator;
   a gas release part for releasing the gas emitted from the inflator to an exterior when a distal end part of the introduction tube is blocked; and
   a pocket part formed in a bottom surface of the airbag in such a manner as to be inwardly recessed with respect to the airbag.

2. The airbag device of claim 1, wherein the introduction tube functions as a one-way valve for preventing the gas from flowing from the gas release part when internal pressure increases after the airbag is expanded.

3. The airbag device of claim 1, wherein the introduction tube is positioned so to be set apart from the pocket part.

4. The airbag device of claim 1, wherein the introduction tube extends in a tapered shape toward a largest length of the airbag as the airbag is completely expanded.

5. The airbag device of claim 1, wherein the airbag has a first chamber part disposed between the inflator and the introduction tube; and a second chamber part connected to the first chamber part via the introduction tube and designed to come into contact with an object to be protected as a result of having been deployed using the gas emitted by the inflator.

6. The airbag device of claim 5, wherein the gas release part is formed between the first chamber part and the second chamber part.

7. The airbag device of claim 5, wherein the first chamber part has a secondary introduction tube for introducing the gas into the introduction tube from the first chamber part.

8. The airbag device of claim 1, wherein the introduction tube has on the distal end part a portion folded so as to be positioned inside the introduction tube.

9. The airbag device according to claim 5, wherein the second chamber part of the airbag is folded and accommodated in a case so as to lie on a folded first chamber part and covered by a lid.

10. The airbag device of claim 9, wherein the first chamber part and the second chamber part are connected by connecting bands, and when the second chamber part expands, the connecting bands extend along an inner surface of the lid that covers the airbag.

* * * * *